March 2, 1937.  H. F. SMITH  2,072,486
REFRIGERATING APPARATUS
Filed Dec. 24, 1934  2 Sheets-Sheet 1
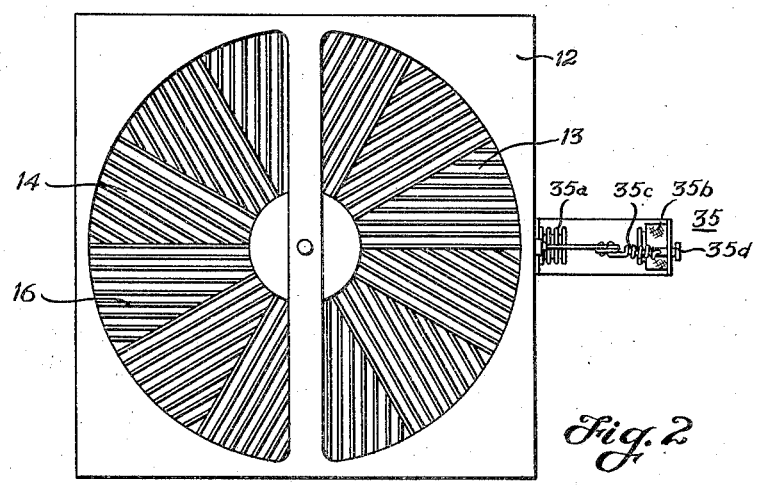
Fig. 2
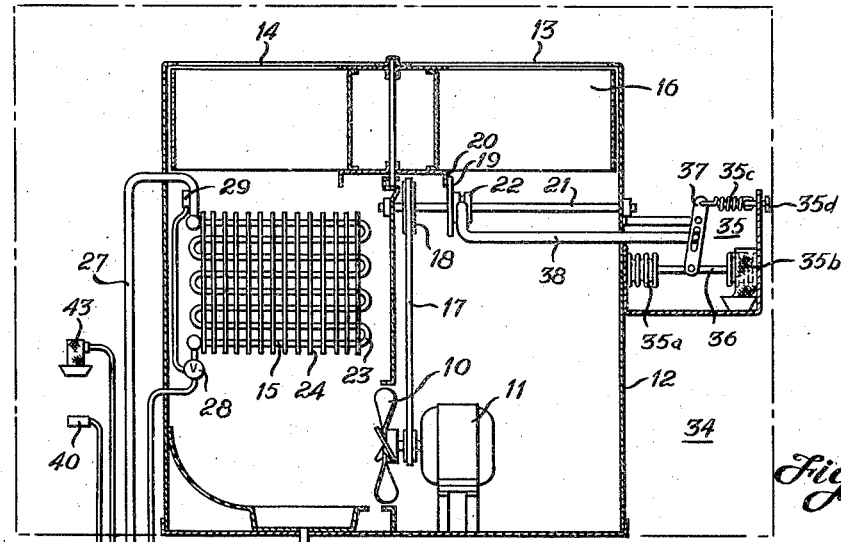
Fig. 1
Fig. 4
INVENTOR.
Harry F. Smith
BY
ATTORNEYS Patented Mar. 2, 1937

2,072,486

UNITED STATES PATENT OFFICE 2,072,486

REFRIGERATING APPARATUS

Harry F. Smith, Dayton, Ohio, assignor to General Motors Corporation, Dayton, Ohio, a corporation of Delaware Application December 24, 1934, Serial No. 758,872

15 Claims. (Cl. 62—6)

This invention relates to refrigeration.

An object of this invention is to provide an air conditioning system or method in which the air may have its moisture content reduced by a suitable cooling means or step, and in which the ultimate dry bulb temperature need not be reduced materially or may be reduced in varying degrees as desired.

Further objects and advantages of the present invention will be apparent from the following description, reference being had to the accompanying drawings, wherein a preferred form of the present invention is clearly shown.

In the drawings:

Fig. 1 is a view, partly diagrammatic and partly cross-sectional, of an apparatus embodying features of my invention;

Fig. 2 is a plan view of a portion of the apparatus shown in Fig. 1;

Fig. 4 is a diagrammatic view of a slightly different type of control for the apparatus shown in Fig. 1.

Figure 3:
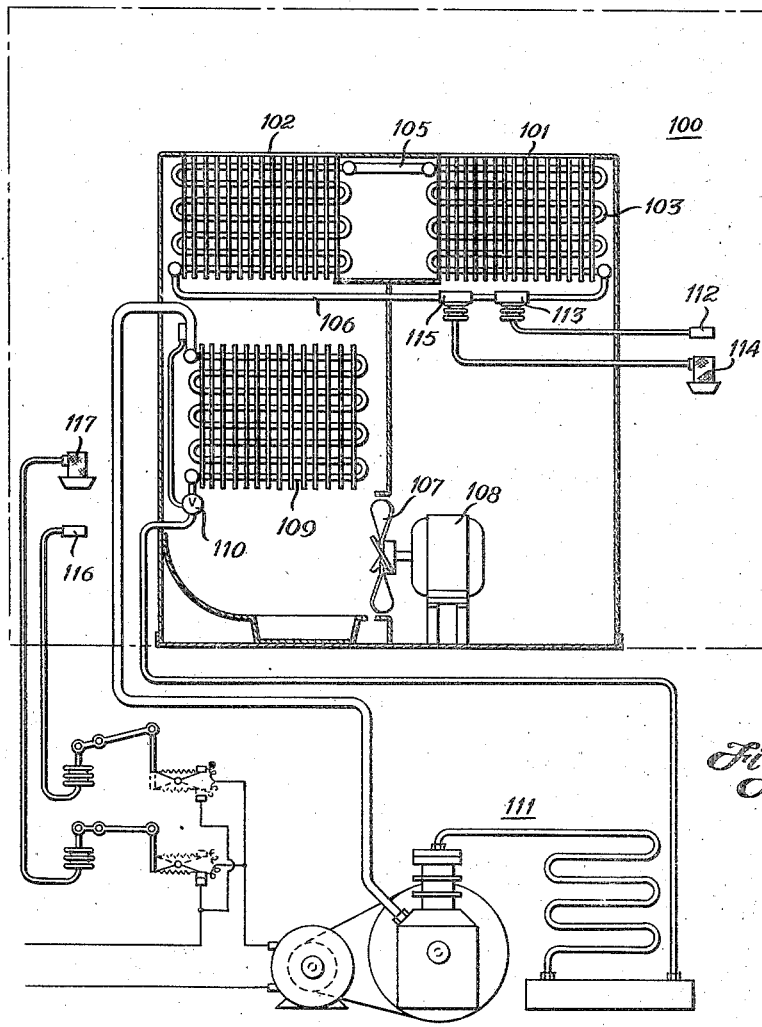
Fig. 3 is a view, somewhat similar to Fig. 1, but showing a modification.

In conditioning air according to my invention, the superheat of the air above its dew point is temporarily removed. Thereafter the moisture content of the air is reduced by cooling the air below its dew point by suitable cooling means. Thereafter, if desired, a portion or all of the superheat previously taken out of the air is restored to conditioned air. This method or system of conditioning air is particularly advantageous where the outside air has a relatively low dry bulb temperature, but has an uncomfortably high relative humidity. Under such conditions, it generally suffices to remove some of the moisture from the air without materially lowering its dry bulb temperature. My invention is particularly adapted to accomplish and at the same time adapts itself readily to other conditions where it is desired to reduce the dry bulb temperature with or without reducing the relative humidity.

In the embodiment shown in Figs. 1 and 2, an air conditioner is shown in which a stream of air is caused to flow by means of a fan 10 driven by an electric motor 11. This stream of air enters the cabinet 12 at 13 and leaves the cabinet at 14. Instrumentalities are provided at 13 and 14 for removing heat from the air at 13 and restoring such heat to the air at 14. Such instrumentalities may include regulating devices for governing the amount of heat so transferred. In addition an air cooler 15 is placed in the path of the stream of air so that the cooler 15 may remove moisture from the air after a certain amount of sensible heat has been removed from the air at 13 and before the heat is restored to the air at 14.

The instrumentalities above referred to may comprise, in Figs. 1 and 2, a rotating structure or wheel 16 having vertical heat carrying baffles between which the air flows downwardly and upwardly. These baffles are constructed of material which readily absorbs heat and gives it off. As the structure or wheel is rotated, that portion of the wheel which is in the opening 13 tends to remove heat from the air passing downwardly through the opening 13. The wheel is rotated and when the warmed portion of the wheel reaches the opening 14 it gives up the removed heat to the air passing upwardly therethrough.

Any suitable means of rotating the wheel 16 may be provided. Thus a belt 17 connects the motor 11 with the pulley 18. A disk 19 bears against the flange 20 of the wheel 16. Disk 19, which idles on the shaft 21, is clutched thereto by the clutch 22. The clutch 22 may be controlled in accordance with air conditions as hereafter described, and thus the amount of heat removed and restored to the air by the wheel 16 is regulated.

The air cooler 15 may be of any suitable construction and may derive its refrigerating power from any suitable source. Preferably the cooler 15 may be an evaporator, constructed, for instance, of a sinuous pipe 23 having fins at 24. The interior of the tube 23 may form the refrigerant evaporator which is supplied with liquid refrigerant by the pipe 25 from a refrigerant liquefying unit 26. The evaporated refrigerant returns through the pipe 27 to the unit 26. A suitable automatic expansion valve 28 is placed at the inlet of the evaporator. This valve preferably is of the type which automatically introduces liquid refrigerant into the evaporator when the refrigerant pressure therein is reduced below a predetermined limit. This valve is also provided with a thermostatic bulb 29 placed at the outlet of the evaporator which automatically throttles the valve when the refrigerating effect reaches the outlet of the evaporator and thus prevents frost back in the line 27. The calibration of the valve 28 is preferably such that the temperature of the cooler 15 is above 32° F. but sufficiently low to properly cool the air.

The refrigerant liquefying unit 26 may be of any suitable construction. Preferably it includes a compressor 30, condenser 31, refrigerant receiver 32 and motor 33 all operatively connected as will be readily apparent to those skilled in the art.

Controls may be provided for governing the amount of heat which is removed from the air and restored thereto at the inlet 13 and outlet 14 by the wheel 16. Also a suitable control may be provided for regulating the amount of refrigeration furnished by the air cooler 15. If desired, the removal of heat at 13 and restoration thereof at 14 may be governed in accordance with conditions produced by the apparatus, such as by the relative humidity of the air in the enclosure 34, which is the enclosure in which the conditioned air is discharged. A psychrometer 35 may be placed in the enclosure 34 to govern the rotation of wheel 16 and the consequent transfer of heat from the intake to the discharge of the conditioner. The psychrometer 35 may actuate a lever 37 which is connected by the rod 38 with the clutch 22 thus operating the clutch to cause rotation of the wheel whenever the relative humidity is above a predetermined limit and to stop rotation of the wheel whenever the relative humidity is below a predetermined limit. Therefore whenever the relative humidity (or wet bulb temperature) is above a certain predetermined limit, the apparatus removes heat from the air and restores the same at 13 and 14 respectively; but when the relative humidity is below a predetermined limit no such removal and restoration of heat takes place.

The psychrometer 35 may be of any suitable construction. For example it may include a dry bulb 35a mounted in opposition to the wet bulb 35b, the movable ends of the bulbs being connected by the rod 36 which actuates lever 37. A spring 35c bears against the lever 37, and by adjustment of its tension by turning screw 35d, the setting of the psychrometer may be adjusted to suit individual needs.

The amount of refrigeration furnished to the cooler 15 may be made responsive to conditions created by the apparatus. Thus a dry bulb 40 may be connected to bellows 41 which operates the snap switch 42 and starts and stops the operation of the refrigerant liquefying unit in accordance with dry bulb conditions in enclosure 34. In addition, a wet bulb 43 (or psychrometer) may also be placed in the enclosure 34, which may be connected to a bellows 44 which operates the snap switch 45 which controls the operation of the refrigerant liquefying unit 26 in parallel relationship with the switch 42. Thus whenever the dry bulb temperature in enclosure 34 rises above a predetermined limit the unit 26 operates. Likewise when the wet bulb temperature (or relative humidity) also rises, the unit 26 operates under the control of bulb 43. When the dry bulb temperature and the wet bulb temperature (or relative humidity) both fall below a predetermined limit the unit 26 stops. Thus the amount of refrigeration furnished to the cooler 15 is governed in accordance with conditions created by the apparatus in the enclosure 34.

The control for the refrigerant liquefying unit 26 may be slightly modified as shown in Fig. 4. The operation of the refrigerant liquefying unit 26 may be made responsive to the "effective temperature" in the enclosure 34. The term "effective temperature" is a term now well known in the air conditioning art. An instrument approximating in responsiveness the "effective temperature" may be used to control the motor 33. Thus a relative humidity responsive member 51, made of wood or the like, operates a lever 52 which is connected to a rotatable base 53 upon which is mounted the bi-metallic thermostat 54. As the relative humidity changes the base 53 is slightly rotated about fulcrum 53a and thus the combination dry bulb temperature and relative humidity conditions may become both effective on a control to close the contacts 55 which govern the starting and stopping of the unit 26. A suitable rotatable knob 56 may be provided for turning a screw which adjusts the position of the relative humidity responsive member 51 to vary the effective temperature at which the instrument opens and closes the contact 55.

In the modification shown in Fig. 3, air for the enclosure 100 may enter the air conditioning apparatus at 101 and leave the apparatus at 102. Heat may be removed from the air stream by a secondary refrigerant evaporator 103 and may be restored to the air stream by the secondary refrigerant condenser 104. The vapors may flow from the evaporator 103 to the condenser 104 through the connection 105, and the liquid may return from the condenser 104 to the condenser 103 through the connection 106. The air stream may be caused to flow through the apparatus by means of a fan 107 driven by a motor 108. An air cooler 109 may be interposed between the evaporator 105, condenser 104. This cooler 109 may form an evaporator similar to that described with respect to Fig. 1, being provided with a valve 110 similar to the valve 28 and with a refrigerant liquefying unit 111 similar to the unit 26.

The removal and restoration of heat to the air stream may be made responsive to conditions created by the apparatus. Thus a dry bulb 112, in the enclosure 100, opens and closes a valve 113 in the connection 106. Also if it is desired a wet bulb 114 controls the operation of the valve 115 in the connection 106. The control may be such, that if the dry bulb temperature is above a predetermined limit, the valve 113 is closed and the entire refrigerating capacity of the unit 111 is made primarily available for reducing dry bulb temperature since the action of the evaporator 103 of the condenser 104 is stopped. The wet bulb 114 (which may be also combined with a dry bulb, not shown, so that it is practically responsive to relative humidity) tends to open the valve 115 whenever the relative humidity or wet bulb temperature rises above a predetermined limit. If desired, the dry bulb 112 and valve 113 may be omitted so that only the wet bulb or psychrometer 114 controls the secondary refrigerant.

A dry bulb 116 may control the unit 111 substantially the same as dry bulb 40 and a wet bulb 117 may control it substantially the same as wet bulb 43. The unit 111 may be controlled by a single switch, similar to that shown in Fig. 4 in response to the "effective temperature" in the enclosure 100 in lieu of the controls 116 and 117.

While the preferred form of automatic controls have been specifically illustrated and described, it is to be understood that their form and character may be modified, if desired. For example, wherever a dry bulb thermostat is illustrated or described, the same may be replaced by a wet bulb thermostat, humidistat or effective temperature responsive instrument. Likewise wherever a wet bulb thermostat, humidistat or effective temperature responsive instrument is illustrated or described, the same may be replaced by any one of the other three controls referred to.

While the form of embodiment of the present invention as herein disclosed, constitutes a preferred form, it is to be understood that other forms might be adopted, all coming within the scope of the claims which follow.

What is claimed is as follows:

1. The method of conditioning air for an enclosure which comprises removing heat from air for said enclosure, independently cooling the air after the removal of said heat to remove moisture from said air, introducing said removed heat to said enclosure, controlling said cooling in accordance with changes in temperature conditions in said enclosure and controlling said removal of heat in accordance with changes in humidity conditions in said enclosure.

2. An air conditioner for a room comprising a blower, a non-fluid heat transferring member comprising a plurality of sets of parallel fins, a heat absorbing and a heat dissipating connection between said member and blower, and a cooler in one of said connections.

3. An air conditioner for a room comprising a blower, a non-fluid heat transferring member within the room exposed on one side to the room atmosphere, means causing air passing through said blower to pass through a heat absorbing section and a heat dissipating section of said member, and a cooler between said sections.

4. An air conditioner comprising a vertically disposed casing, a non-fluid heat transferring member at the upper part of said casing, a fan circulating air in and out of said casing through said member, a cooler in said casing below said member, and means automatically rotating said member in accordance with changes in psychrometric conditions of the air.

5. An air conditioner comprising a vertically disposed casing, a non-fluid heat transferring member at the upper part of said casing, a fan circulating air in and out of said casing through said member, a cooler in said casing below said member, and a motor drivingly connected to said fan and member, means whereby said disk like member may be disconnected from said motor while said fan operates.

6. An air conditioner comprising a vertically disposed casing, a non-fluid heat transferring member at the upper part of said casing, a fan circulating air in and out of said casing through said member, a cooler in said casing below said member, a motor drivingly connected to said fan and member, and means controlling the connection between said motor and member in accordance with changes in psychrometric conditions of the air.

7. An air conditioner comprising a vertically disposed casing, a non-fluid heat transferring member at the upper part of said casing, a fan circulating air in and out of said casing through said member, a cooler in said casing below said member, a motor drivingly connected to said fan and member, and means for modifying the connection between said motor and member in accordance with psychrometric conditions of the air.

8. An air conditioner comprising a casing, a blower, a non-fluid heat transferring member, means causing air passing through said blower to pass through a heat absorbing section and a heat dissipating section of said member, a cooler between said sections, and means for supplying refrigerant to said cooler in accordance with changes in effective temperature conditions of the air being conditioned.

9. An air conditioner comprising a vertically disposed casing, a non-fluid heat transferring member at the upper part of said casing, a fan circulating air in and out of said casing through said member, a cooler in said casing below said member, means automatically rotating said member in accordance with changes in psychrometric conditions of the air, and means supplying refrigerant to said cooler in response to a psychrometric function of the air.

10. In combination with a room, a non-fluid heat transfer member, a cooler, and means causing air from said room to pass through a heat absorbing section of said member through said cooler through a heat dissipating section of said member and thence back into said room, and means for cyclically moving said member in accordance with changes in psychrometric conditions of air passing through said apparatus.

11. In combination with a room, a non-fluid heat transfer member, a cooler, and means for causing air from said room to pass through a heat absorbing section of said member through said cooler through a heat dissipating section of said member and thence back into said room, and means supplying refrigerant to said cooler in accordance with changes in psychrometric conditions of air passing through said apparatus.

12. An air conditioner comprising a casing, mechanism for passing a stream of air through said casing, means for cooling at least a portion of said stream, means for modifying the effect of said cooling means and means responsive to changes in effective temperature for controlling said first named means.

13. An air conditioning apparatus comprising mechanism for flowing a stream of air through a relatively small conditioning zone into a relatively large enclosure where said stream of air is mixed with the air of the enclosure, means for cooling said stream whereby both moisture and/or sensible heat may be removed, means for modifying the effect of said cooling means on the air coming in contact therewith, and means responsive to changes in effective temperature for controlling said first named means.

14. An air conditioning apparatus comprising mechanism for flowing a stream of air through a relatively small conditioning zone into a relatively large enclosure where said stream of air is mixed with the air of the enclosure, means for cooling said stream whereby both moisture and/or sensible heat may be removed, means for modifying the effect of said cooling means on the air coming in contact therewith, means responsive to changes in a function of the psychrometric property of air in said enclosure for controlling said first named means, and means responsive to changes in another function of the psychrometric property of air in said enclosure for controlling said second named means.

15. The method of conditioning air for an enclosure which comprises transferring heat from the air for said enclosure into a non-fluid medium, independently cooling the air after the transfer to remove moisture from said air, introducing the transferred heat from said medium into the air in said enclosure, and controlling the transfer of said heat in accordance with changes in humidity conditions in said enclosure.

HARRY F. SMITH.